(12) United States Patent  
Schick et al.

(10) Patent No.: US 9,290,167 B2  
(45) Date of Patent: Mar. 22, 2016

(54) PRESSURE BALANCING BRAKE SYSTEM AND METHOD

(71) Applicant: Deere & Company, Moline, IL (US)

(72) Inventors: Troy E. Schick, Cedar Falls, IA (US); Christian Jungkind, Waldsee (DE)

(73) Assignee: DEERE & COMPANY, Moline, IL (US)

( * ) Notice: Subject to any disclaimer, the term of this patent is extended or adjusted under 35 U.S.C. 154(b) by 36 days.

(21) Appl. No.: 14/451,552

(22) Filed: Aug. 5, 2014

(65) Prior Publication Data

US 2016/0039399 A1 Feb. 11, 2016

(51) Int. Cl.
*B60T 13/64* (2006.01)
*B60T 11/21* (2006.01)
*B60T 7/04* (2006.01)

(52) U.S. Cl.
CPC .. *B60T 11/21* (2013.01); *B60T 7/04* (2013.01)

(58) Field of Classification Search
CPC ................................ B60T 13/64; B62D 11/18
USPC ................... 303/9.61; 180/242, 308
See application file for complete search history.

(56) References Cited

U.S. PATENT DOCUMENTS

| 3,530,951 | A | * | 9/1970 | Beig | ........................ | B62D 1/22 |
| | | | | | | 180/333 |
| 4,163,413 | A | * | 8/1979 | Kennicutt | ............ | B62D 11/183 |
| | | | | | | 180/6.48 |
| 4,583,788 | A | * | 4/1986 | Rubenstein | ............. | B60T 13/10 |
| | | | | | | 180/6.2 |
| 2013/0127239 | A1 | * | 5/2013 | Brenninger | ............. | B60T 11/21 |
| | | | | | | 303/9.61 |

* cited by examiner

*Primary Examiner* — Christopher Schwartz

(57) ABSTRACT

A vehicle hydraulic brake system includes left and right manually operated brake pedals, and left and right hydraulic brake units. A pedal lock is movable to a locking position wherein the left and right brake pedals operate in unison. Left and right brake valves are operatively coupled to the corresponding brake pedal. A solenoid operated normally closed balance valve is connected between the left and right brake units. Optional left and right solenoid operated normally open blocking valves may be connected the corresponding brake valve and the corresponding brake unit. The blocking valves and the balance valve are controlled by an ECU as a function of sensed vehicle speed and brake pedal operation.

16 Claims, 2 Drawing Sheets

PRESSURE BALANCING BRAKE SYSTEM AND METHOD

FIELD OF THE INVENTION

The present disclosure relates to a vehicle brake control system.

BACKGROUND OF THE INVENTION

Some agricultural tractors have two pedal brake systems so that left/right differential braking can be used to assist in turning the tractor. EU agricultural tractor brake regulations require that differential braking be disabled when the tractor is moving at higher transport speeds. Mechanical manual pedal locks have been used on such two pedal brake systems to disable differential braking by manually locking the brake pedals together. It is desirable to have an automatic means of disabling differential braking. But, mechanically locking the brake pedals together is difficult to automate. Additionally, a mechanical pedal lock does not insure that brake pressures are equal on the right and left sides of the rear axle, as slop in the pedal lock and pedal assembly flex can cause a brake pressure differential.

SUMMARY

According to an aspect of the present disclosure, a vehicle brake system comprising includes a hydraulic pump, a sump, a left manually operated brake member, a right manually operated brake member, a left hydraulic brake unit, and a right hydraulic brake unit. The brake system also includes a left brake valve operatively coupled to the left brake member. The left brake valve has a first pressure responsive pilot acting in opposition to the left brake member, a supply port connected to pump, a return port connected to the sump, and a left work port. A right brake valve is operatively coupled to the right brake member. The right brake valve has a first pressure responsive pilot acting in opposition to the right brake member, a supply port connected to a pressure source, a return port connected to a sump, and a right work port. A normally open left blocking valve has a first port connected to the left work port, and a second port connected to the left brake unit. A normally open right blocking valve has a first port connected to the right work port, and a second port connected to the right brake unit.

A normally closed balance valve has a left port connected to the left brake unit and to the left port, and a right port connected to the right brake unit and to the right work port. A brake member lock has a locking position wherein the left and right brake members operate in unison and an unlocked position wherein the left and right brake members operate independently.

The brake system also includes a vehicle velocity sensor, a left brake member position sensor, and a right brake member position sensor. A control unit is connected to the sensors, to the blocking valves and to the balance valve. The control unit controls the blocking valves and the balance valve in response to the sensors.

The normally closed balance solenoid valve allows differential braking and different pressures on the right and left brakes. The balance valve solenoid is energized to open the balance valve and disable differential braking. Differential braking function is automatically enabled when the tractor is moving at headland speeds, typically less than 15 kph. If the tractor speed exceeds the specified headland speed, differential braking is automatically disabled by energizing the balance valve solenoid and opening the balance valve.

DETAILED DESCRIPTION OF THE DRAWINGS

Figure 1:
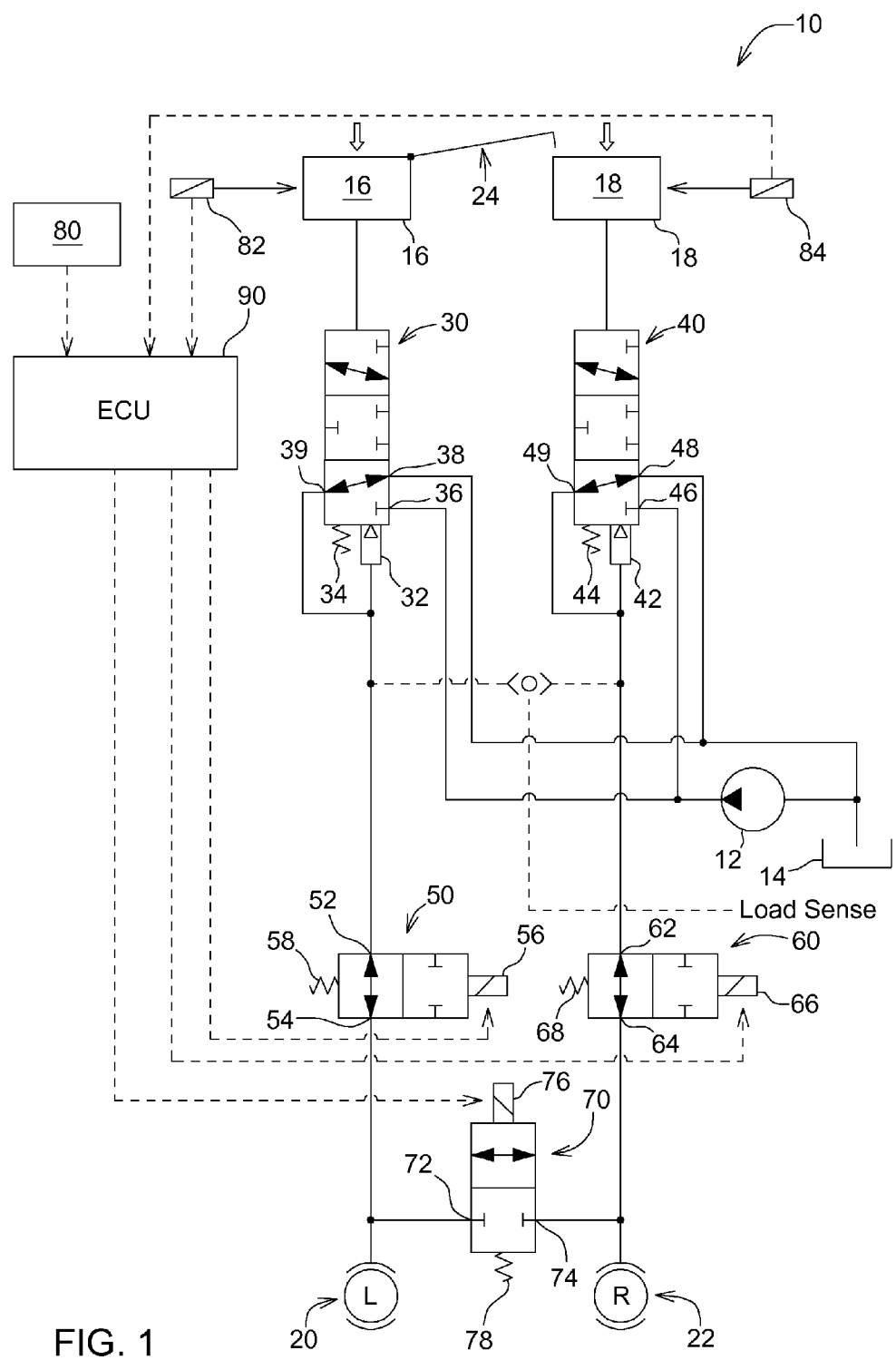
FIG. 1 is a schematic diagram of a brake control system embodying the invention.

Referring to FIG. 1, a vehicle brake system 10 includes a hydraulic pump 12, a sump 14, a left manually operated brake member or pedal 16, a right manually operated brake member or pedal 18, a left hydraulic brake unit 20 and a right hydraulic brake unit 22. A conventional manual mechanical pedal or brake member lock 24 may be used to lock the pedals 16 and 18 together. Lock 24 has a locking position wherein the left and right brake members 16, 18 operate in unison and an unlocked position wherein the left and right brake members 16, 18 operate independently.

The system 10 also includes a left brake valve 30 operatively coupled to the left brake member 16. The left brake valve 30 has a first pressure responsive pilot 32 and a spring 34 which both act in opposition to the left brake member 16, a supply port 36 connected to the pressure source pump 12, a return port 38 connected to the sump 14, and a left work port 39 connected to the left brake unit 20 and to the pilot 32. A right brake valve 40 is operatively coupled to the right brake member 18. The right brake valve 40 has a first pressure responsive pilot acting 42 and a spring 44 which both act in opposition to the right brake member 18, a supply port 46 connected to pump 12, a return port 48 connected to sump 14, and a right work port 49 connected to the right brake unit 22 and to the pilot 42.

The system 10 also includes a solenoid operated normally open left blocking valve 50 which has a first port 52 connected to the left work port 39, a second port 54 connected to the left brake unit 20, a solenoid 56, and a spring 58 which acts in opposition to the solenoid 56. A solenoid operated normally open right blocking valve 60 has a first port 62 connected to the right work port 49, a second port 64 connected to the right brake unit 22, a solenoid 66, and a spring 68 which acts in opposition to the solenoid 56;

The system 10 also includes a solenoid operated normally closed balance valve 70 which has a left port 72 connected to the left brake unit 20, a right port 74 connected to the right brake unit 22, a solenoid 76 and a spring 78 which acts in opposition to the solenoid 76.

The system 10 also includes a vehicle velocity sensor 80, a left brake member position sensor 82, a right brake member position sensor 84, and an electronic control unit (ECU) 90. ECU unit 90 is connected to the sensors 80-84, to the solenoid 56 of the left blocking valve 50, to the solenoid 66 of the left blocking valve 60, and to the solenoid 76 of the balance valve 70.

The ECU 90 is programmed to control valves 50, 60 and 70 as a function of signals from sensors 80, 82 and 84. Preferably, the ECU 90 may be programmed to energize the solenoid 76 to open the balance valve 70 when the velocity sensor 80 senses that vehicle velocity exceeds a velocity threshold. This will assure that the pressure in brake units 20 and 22 will be equalized when the vehicle (not shown) is operating at high on-road transport speeds even when the pedal lock 24 is not in its locked position.

The ECU 90 may also be programmed to de-energize the solenoid 76 of the balance valve 70 (to close valve 70) when the velocity sensor 80 senses that vehicle velocity is less than the velocity threshold and the position sensors 82 and 84 sense that both brake members 16 and 18 are not depressed.

The ECU 90 may also be programmed to c) energize the solenoid 66 of the right blocking valve 60 and de-energize the solenoid 56 of the left blocking valve 56 when the solenoid 76 of the balance valve 70 is energized and the position sensors 82 and 84 sense that left brake member 16 is depressed and the right brake member 18 is not depressed. This allows the left brake unit 20 only to be applied.

The ECU 90 may also be programmed to d) energize the solenoid 56 of the left blocking valve 50 and de-energize the solenoid 66 of the right blocking valve 60 when the solenoid 76 of the balance valve 70 is energized and the position sensors 82, 84 sense that left brake member 16 is not depressed and the right brake member 18 is depressed. This allows the right brake unit 22 only to be applied.

The ECU 90 may also be programmed to otherwise e) de-energize the solenoids 56 and 66 of the left and right blocking valves 50 and 60.

Figure 2:
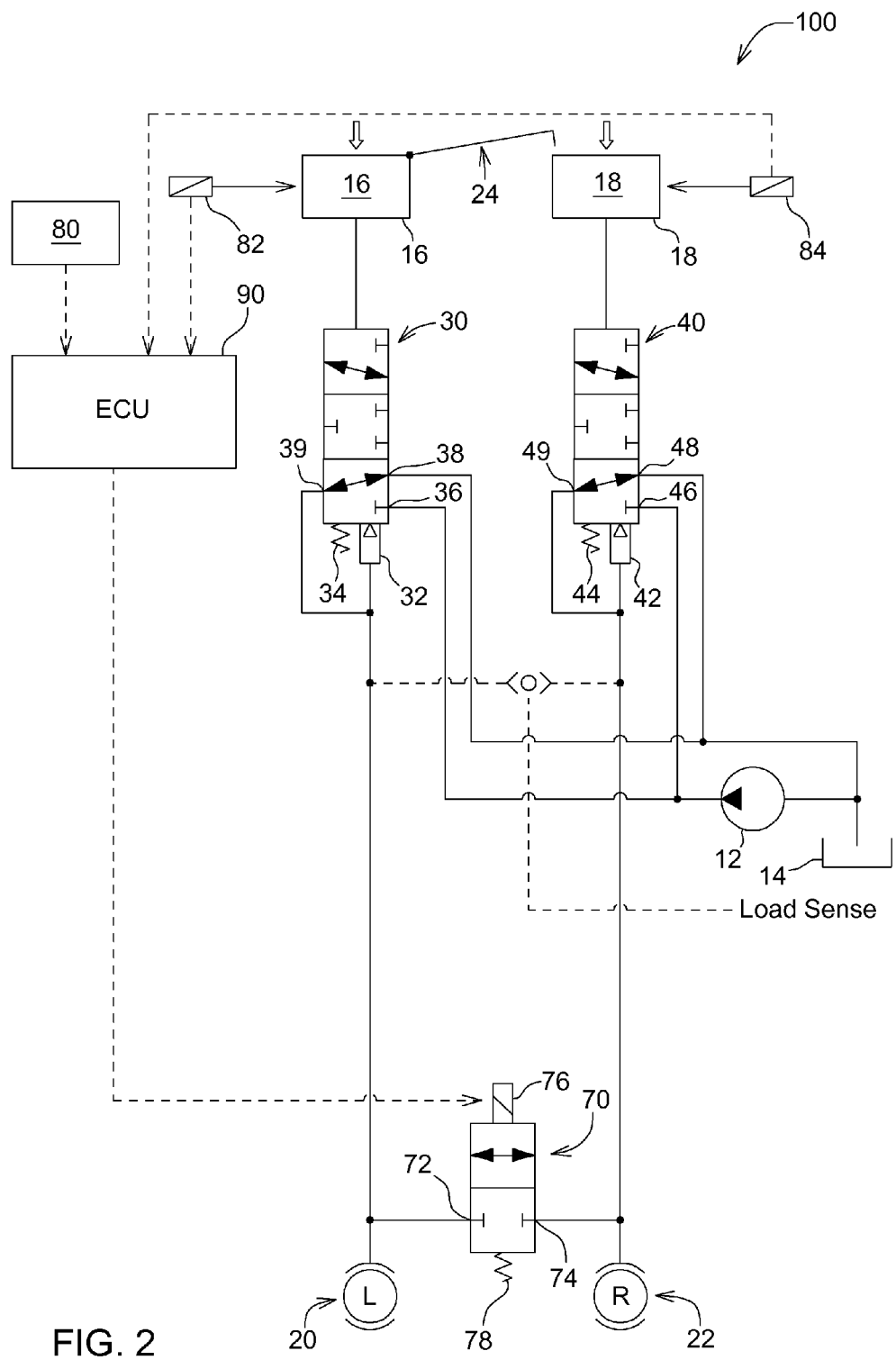
FIG. 2 is a schematic diagram of an alternate embodiment of the invention of FIG. 1.

Referring now to FIG. 2, the vehicle brake system 100 is similar to the system 10 of FIG. 1, and the same reference numbers are used for the same parts. System 100 differs in that it lacks the left and right blocking valve 50 and 60, so that left work port 39 is connected directly to left brake unit 20, and right work port 49 is connected directly to right brake unit 22.

For the system 100 the ECU 90 is preferably programmed to energize the solenoid 76 to open the balance valve 70 when the velocity sensor 80 senses that vehicle velocity exceeds a velocity threshold. Again, this will assure that the pressure in brake units 20 and 22 will be equalized when the vehicle (not shown) is operating at high on-road transport speeds even when the pedal lock 24 is not in its locked position.

For the system 100 the ECU 90 may also be programmed to de-energize the solenoid 76 of the balance valve 70 (to close valve 70) when the velocity sensor 80 senses that vehicle velocity is less than the velocity threshold and the position sensors 82 and 84 sense that both brake members 16 and 18 are not depressed.

The conversion of the above functions into a standard language for implementing in a digital computer or microprocessor of the ECU 90 will be evident to one with ordinary skill in the art.

The systems 10 and 100 operate to insure that the rear axle right and left brake pressures are equal when the operator is applying the brakes in a transport condition. The systems 10 and 100 automatically disable differential braking in a two pedal brake system.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A vehicle brake system comprising:
a hydraulic pump;
a sump;
a left manually operated brake member;
a right manually operated brake member;
a left brake unit;
a right brake unit;
a left brake valve operatively coupled to the left brake member, the left brake valve having a first pressure responsive pilot acting in opposition to the left brake member, a supply port connected to a pressure source, a return port connected to a sump, and a work port connected to the left brake unit;
a right brake valve operatively coupled to the right brake member, the right brake valve having a first pressure responsive pilot acting in opposition to the right brake member, a supply port connected to a pressure source, a return port connected to a sump, and a work port connected to the right brake unit;
a solenoid operated normally closed balance valve having a left port connected to the left brake unit and to the work port of the left brake valve, and having a right port connected to the right brake unit and to the work port of the right brake valve; and
a brake member lock having a locking position wherein the left and right brake members operate in unison and an unlocked position wherein the left and right brake members operate independently.

2. The brake system of claim 1, further comprising:
a vehicle velocity sensor; and
a control unit connected to the sensor and to the solenoid of the balance valve, the control unit energizing the solenoid to open the balance valve when the velocity sensor senses that vehicle velocity exceeds a velocity threshold.

3. The brake system of claim 1, further comprising:
a vehicle velocity sensor;
a left brake member position sensor;
a right brake member position sensor; and
a control unit connected to the sensors and to the solenoid of the balance valve, the control unit energizing the solenoid to open the balance valve when the velocity sensor senses that vehicle velocity exceeds a velocity threshold, the control unit de-energizes the solenoid of the balance valve when the velocity sensor senses that vehicle velocity is less than the velocity threshold and the position sensors sense that both brake members are not depressed.

4. The brake system of claim 1, further comprising:
a solenoid operated left blocking valve having a first port connected to the work port of the left brake valve, and a second port connected to the left brake unit; and
a solenoid operated right blocking valve having a first port connected to the work port of the right brake valve, and a second port connected to the right brake unit.

5. The brake system of claim 4, further comprising:
a vehicle velocity sensor;
a left brake member position sensor;
a right brake member position sensor; and
a control unit connected to the sensors, to the solenoid of the balance valve and to the solenoids of the left and right blocking valves, the control unit a) energizing the solenoid to open the balance valve when the velocity sensor senses that vehicle velocity exceeds a velocity threshold, b) de-energizing the solenoid of the balance valve when the velocity sensor senses that vehicle velocity is less than the velocity threshold and the position sensors sense that both brake members are not depressed, c) energizing the solenoid of the right blocking valve and de-energizing the solenoid of the left blocking valve when the solenoid of the balance valve is energized and the position sensors sense that left brake member is depressed and the right brake member is not depressed, d) energizing the solenoid of the left blocking valve and de-energizing the solenoid of the right blocking valve when the solenoid of the balance valve is energized and the position sensors sense that left brake member is not depressed and the right brake member is depressed, else the control unit e) de-energizing the solenoids of the left and right blocking valves.

6. A vehicle brake system comprising:

a hydraulic pump;

a sump;

a left manually operated brake member;

a right manually operated brake member;

a left hydraulic brake unit;

a right hydraulic brake unit;

a left brake valve operatively coupled to the left brake member, the left brake valve having a first pressure responsive pilot acting in opposition to the left brake member, a supply port connected to pump, a return port connected to the sump, and a left work port;

a right brake valve operatively coupled to the right brake member, the right brake valve having a first pressure responsive pilot acting in opposition to the right brake member, a supply port connected to a pressure source, a return port connected to a sump, and a right work port;

a normally open left blocking valve having a first port connected to the left work port, and a second port connected to the left brake unit;

a normally open right blocking valve having a first port connected to the right work port, and a second port connected to the right brake unit;

a normally closed balance valve having a left port connected to the left brake unit and to the left port, and having a right port connected to the right brake unit and to the right work port; and a brake member lock having a locking position wherein the left and right brake members operate in unison and an unlocked position wherein the left and right brake members operate independently;

a vehicle velocity sensor;

a left brake member position sensor;

a right brake member position sensor; and a control unit connected to the sensors, to the blocking valves and to the balance valve, the control unit controlling the blocking valves and the balance valve in response to the sensors.

7. The brake system of claim 6, wherein:

the control unit closes the balance valve when the velocity sensor senses that vehicle velocity is less than the velocity threshold and the position sensors sense that both brake members are not depressed.

8. The brake system of claim 6, wherein:

the control unit b) closing the balance valve when the velocity sensor senses that vehicle velocity is less than the velocity threshold and the position sensors sense that both brake members are not depressed, the control unit c) closing the right blocking valve and opening the left blocking valve when the balance valve is open and the position sensors sense that left brake member is depressed and the right brake member is not depressed, the control unit d) closing the left blocking valve and opening the right blocking valve when the balance valve is open and the position sensors sense that left brake member is not depressed and the right brake member is depressed, else the control unit e) opening the left and right blocking valves.

9. A vehicle brake system comprising:

a hydraulic pump;

a sump;

a left manually operated brake member;

a right manually operated brake member;

a left brake unit;

a right brake unit;

a left brake valve operatively coupled to the left brake member, the left brake valve having a first pressure responsive pilot acting in opposition to the left brake member, a supply port connected to a pressure source, a return port connected to a sump, and a work port connected to the left brake unit;

a right brake valve operatively coupled to the right brake member, the right brake valve having a first pressure responsive pilot acting in opposition to the right brake member, a supply port connected to a pressure source, a return port connected to a sump, and a work port connected to the right brake unit;

a normally closed balance valve having a left port connected to the left brake unit and to the work port of the left brake valve, and having a right port connected to the right brake unit and to the work port of the right brake valve;

a brake member lock having a locking position wherein the left and right brake members operate in unison and an unlocked position wherein the left and right brake members operate independently; and a control unit which controls the balance valve as a function of sensed parameters.

10. The brake system of claim 9, further comprising:

a vehicle velocity sensor; and the control unit opening the balance valve when the velocity sensor senses that vehicle velocity exceeds a velocity threshold.

11. The brake system of claim 9, further comprising:

a normally open left blocking valve having a first port connected to the left work port, and a second port connected to the left brake unit;

a normally open right blocking valve having a first port connected to the right work port, and a second port connected to the right brake unit;

a vehicle velocity sensor;

a left brake member position sensor;

a right brake member position sensor; and the control unit opening the balance valve when the velocity sensor senses that vehicle velocity exceeds a velocity threshold, the control unit b) closing the balance valve when the velocity sensor senses that vehicle velocity is less than the velocity threshold and the position sensors sense that both brake members are not depressed, the control unit c) closing the right blocking valve and opening the left blocking valve when the balance valve is open and the position sensors sense that left brake member is depressed and the right brake member is not depressed, the control unit d) closing the left blocking valve and opening the right blocking valve when the balance valve is open and the position sensors sense that left brake member is not depressed and the right brake member is depressed, else the control unit e) opening the left and right blocking valves.

12. The brake system of claim 9, further comprising:
a vehicle velocity sensor;
a left brake member position sensor; and
a right brake member position sensor, the control unit closing the balance valve when the velocity sensor senses that vehicle velocity is less than the velocity threshold and the position sensors sense that both brake members are not depressed.

13. A method of operating a vehicle brake system having a hydraulic pump, a sump, a left manually operated brake member, a right manually operated brake member, a left hydraulic brake unit, a right hydraulic brake unit, a left brake valve operatively coupled to the left brake member, a right brake valve operatively coupled to the right brake member, and a normally closed balance valve having a left port connected to the left brake unit, and having a right port connected to the right brake unit, the method comprising:
sensing vehicle velocity;
sensing a left brake member position;
sensing a right brake member position;
opening the balance valve when the vehicle velocity exceeds a velocity threshold; and
closing the balance valve when the vehicle velocity is less than the velocity threshold and both brake members are not depressed.

14. The method of claim 13, wherein vehicle brake system further comprises:
a brake member lock having a locking position wherein the left and right brake members operate in unison and an unlocked position wherein the left and right brake members operate independently.

15. The method of claim 13, wherein:
the left brake valve includes a first pressure responsive pilot acting in opposition to the left brake member, a supply port connected to a pressure source, a return port connected to a sump, and a work port connected to the left brake unit, the right brake valve having a first pressure responsive pilot acting in opposition to the right brake member, a supply port connected to a pressure source, a return port connected to a sump, and a work port connected to the right brake unit.

16. A method of operating a vehicle brake system having a hydraulic pump, a sump, a left manually operated brake member, a right manually operated brake member, a left hydraulic brake unit, a right hydraulic brake unit, a left brake valve operatively coupled to the left brake member, a right brake valve operatively coupled to the right brake member, a normally open left blocking valve connected between the left brake valve and the left brake unit, a normally open right blocking connected between the right brake valve and the right brake unit, and a normally closed balance valve having a left port connected to the left brake unit, and having a right port connected to the right brake unit, the method comprising:
sensing vehicle velocity;
sensing a left brake member position;
sensing a right brake member position;
opening the balance valve when the vehicle velocity exceeds a velocity threshold; and
closing the balance valve when vehicle velocity is less than the velocity threshold and both brake members are not depressed;
closing the right blocking valve and opening the left blocking valve when the balance valve is open, the left brake member is depressed and the right brake member is not depressed;
closing the left blocking valve and opening the right blocking valve when the balance valve is open, the left brake member is not depressed and the right brake member is depressed; else
opening the left and right blocking valves.

* * * * *